United States Patent
Bluma

(10) Patent No.: US 8,407,862 B2
(45) Date of Patent: Apr. 2, 2013

(54) RELEASABLE BI-DIRECTIONAL CONNECTOR

(75) Inventor: Conrad Bluma, Custer, WI (US)

(73) Assignee: The Worth Company, Stevens Point, WI (US)

( * ) Notice: Subject to any disclaimer, the term of this patent is extended or adjusted under 35 U.S.C. 154(b) by 326 days.

(21) Appl. No.: 12/848,418

(22) Filed: Aug. 2, 2010

(65) Prior Publication Data

US 2012/0023716 A1   Feb. 2, 2012

(51) Int. Cl.
*A44B 15/00* (2006.01)

(52) U.S. Cl. ............ 24/3.6; 24/598.5; 70/459; 70/456 R

(58) Field of Classification Search ............ 70/459, 70/456 R, 460; 24/598.5, 102 SL, 576.1, 24/580.1, 3.6, 600.2; 59/85; D3/207; 206/37.1, 206/38.1, 37.4, 37.5, 37.6, 37.7, 37.8; 43/43.1, 43/44.83, 44.87, 44.92, 44.95, 42.49; D22/134
See application file for complete search history.

(56) References Cited

U.S. PATENT DOCUMENTS

| | | | | |
|---|---|---|---|---|
| 370,918 | A | * | 10/1887 | Armstrong ........................ 59/85 |
| 479,649 | A | * | 7/1892 | Lettre ........................ 24/102 SL |
| 974,950 | A | | 11/1910 | Carter |
| 1,114,289 | A | * | 10/1914 | Rittenhouse ...................... 59/85 |
| 1,219,873 | A | * | 3/1917 | Sapo ......................... 24/102 SL |
| 1,375,090 | A | | 4/1921 | Grode |
| 1,438,264 | A | * | 12/1922 | Rygh .......................... 24/600.6 |
| 1,460,998 | A | | 7/1923 | Zangrilli |
| 1,606,672 | A | * | 11/1926 | Stamirowski .............. 24/582.12 |
| 1,644,562 | A | | 10/1927 | Browning |
| 2,307,808 | A | * | 1/1943 | Segal ........................... 24/600.6 |
| 2,435,152 | A | * | 1/1948 | Morse ............................. 70/459 |
| 2,503,211 | A | * | 4/1950 | Ormsbee ........................ 70/459 |
| 2,916,907 | A | | 12/1959 | Bridwell |
| 2,986,788 | A | * | 6/1961 | Hasek ............................. 24/374 |
| 3,478,550 | A | * | 11/1969 | Salvesen ........................ 70/459 |
| 3,597,951 | A | | 8/1971 | Nadel |
| 3,736,781 | A | * | 6/1973 | Foote ......................... 70/456 R |
| 3,861,814 | A | | 1/1975 | Fisher |

(Continued)

OTHER PUBLICATIONS

Metal Valet Keychain; APEX promotional products; http://www.apexpromotionalproducts.com/metal-valet-keychain-promotional-key-chain-k...; Nov. 11, 2009; Copyrighted 2006.

(Continued)

*Primary Examiner* — Robert J Sandy
*Assistant Examiner* — Rowland D Do
(74) *Attorney, Agent, or Firm* — Boyle Fredrickson, S.C.

(57) ABSTRACT

A bi-directional releasable connector includes a connecting link defining a main tension leg and a pair of looped ends, the connecting link engaging a pair of spring-biased plungers axially movable independently of one another inside an outer housing. Axially outward movement of the plungers under the bias of the spring is limited by stops in the housing engaged by the plungers. Either end may be selectively opened and, in the static position with both ends closed, oppositely directed axial loads on the ends of the connector link are borne by the tension leg which is preferably made of steel or other high tensile strength material. Axial loads on the connector impose no loads or forces on the remaining components.

24 Claims, 12 Drawing Sheets

U.S. PATENT DOCUMENTS

| | | | |
|---|---|---|---|
| 3,872,698 A * | 3/1975 | Feinberg | 70/459 |
| 4,077,243 A | 3/1978 | Tyson | |
| 4,324,121 A | 4/1982 | Richter | |
| 4,369,551 A | 1/1983 | Heredia | |
| 4,592,219 A * | 6/1986 | Richter | 70/456 R |
| 4,776,191 A | 10/1988 | MacDonald | |
| 4,821,543 A | 4/1989 | Scungio | |
| 5,457,976 A | 10/1995 | Stillwagon | |
| 5,517,839 A | 5/1996 | Parsons | |
| 5,685,185 A | 11/1997 | MacDonald | |
| 5,752,401 A | 5/1998 | MacDonald | |
| 6,536,247 B2 * | 3/2003 | Huang | 70/456 R |
| 6,543,959 B1 | 4/2003 | Jore | |
| 6,688,800 B2 | 2/2004 | Kresge | |
| 6,848,287 B1 * | 2/2005 | Huang | 70/456 R |
| 6,948,275 B1 | 9/2005 | Lehmann | |

OTHER PUBLICATIONS

Lobster Claw key clip with 12" Slim coil; http://www.apexpromotionalproducts.com/lobster-claw-key-clip-with-12-slim-coil--prom...; Nov. 11, 2009; Copyrighted 2006.

UMX Sports Reels for Ski Pass or Name Badges with Big Area for Custom Imprint; p. 2 of 3; http://www.lanyardsupply.com/lanyards/badge-reel/plain/ski-pass-sports-reels-rt-08-14.htm; Nov. 11, 2009.

\* cited by examiner

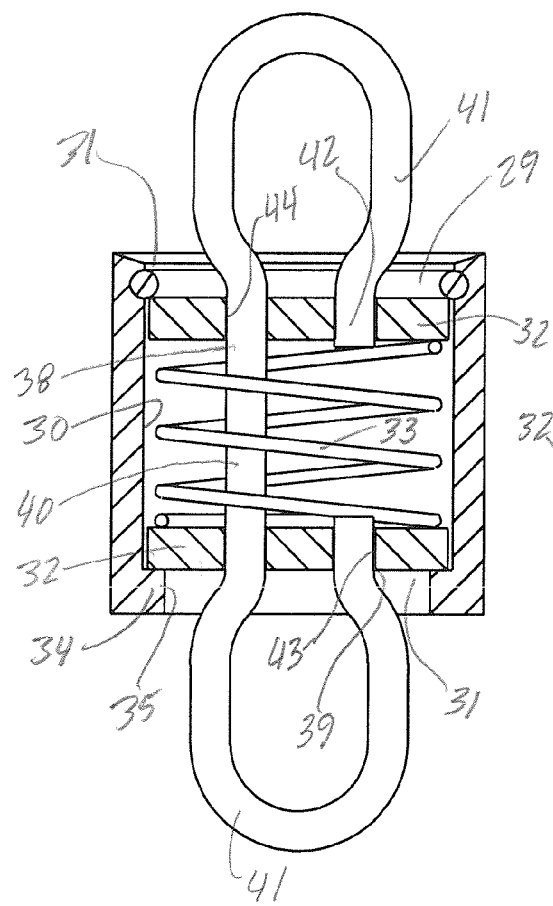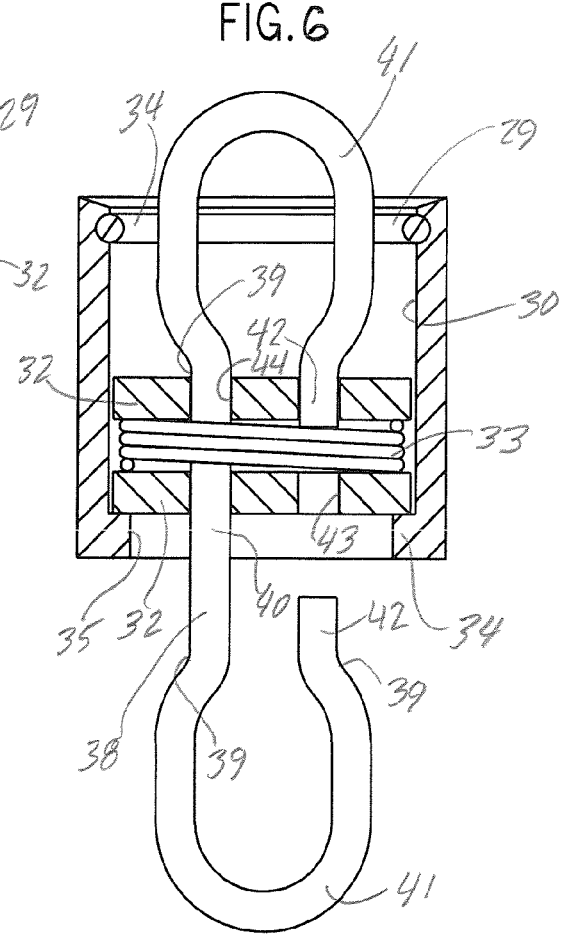

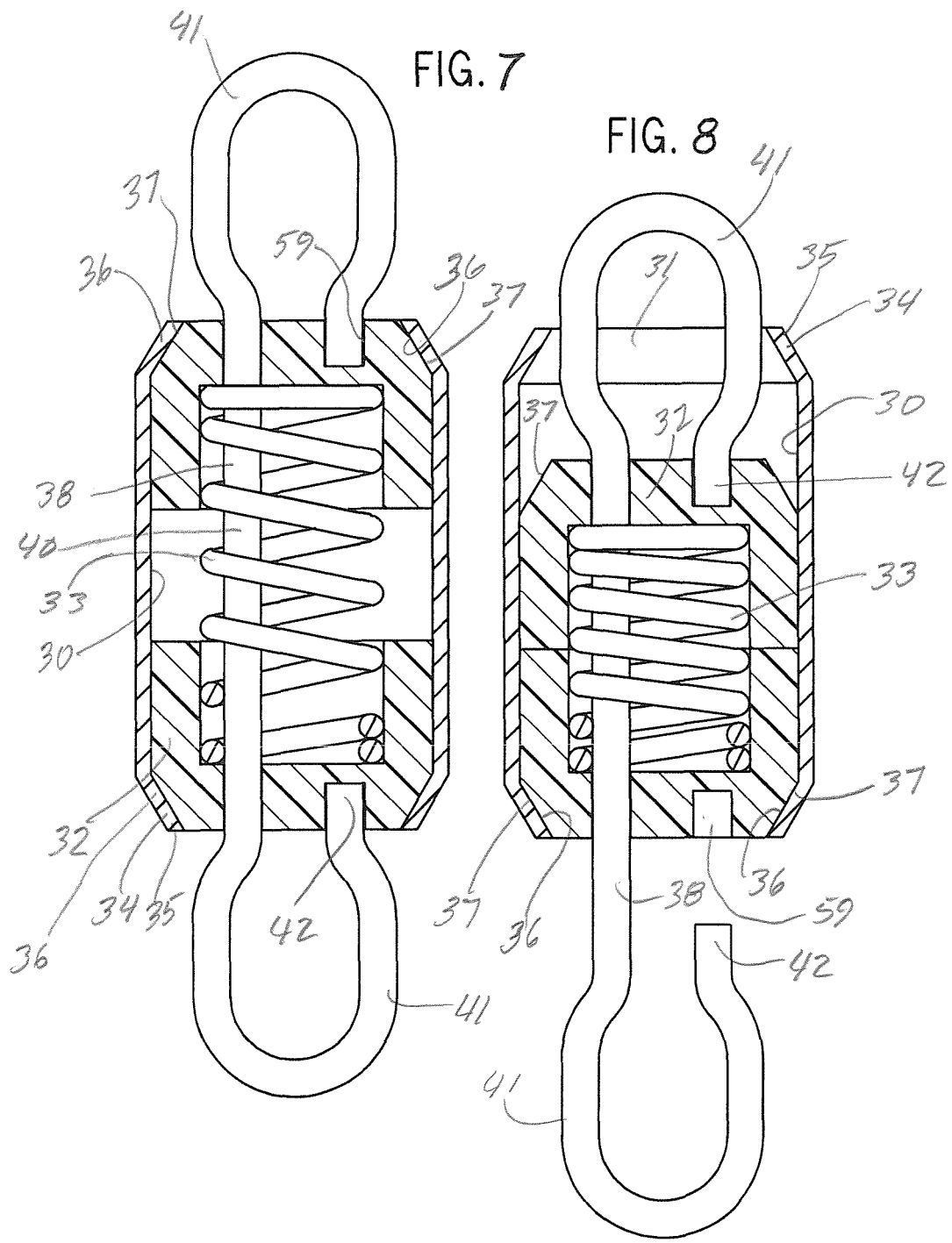

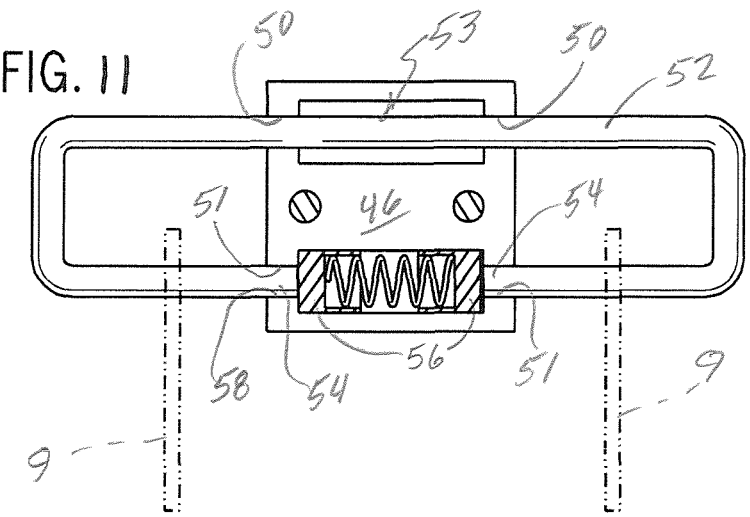
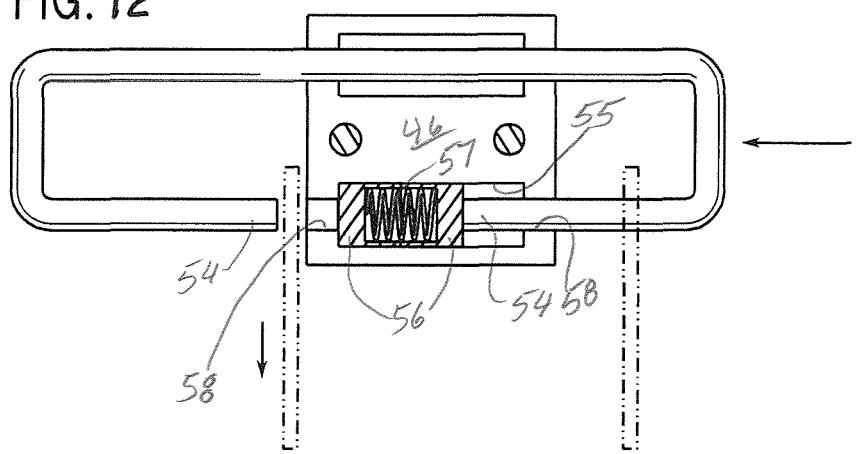
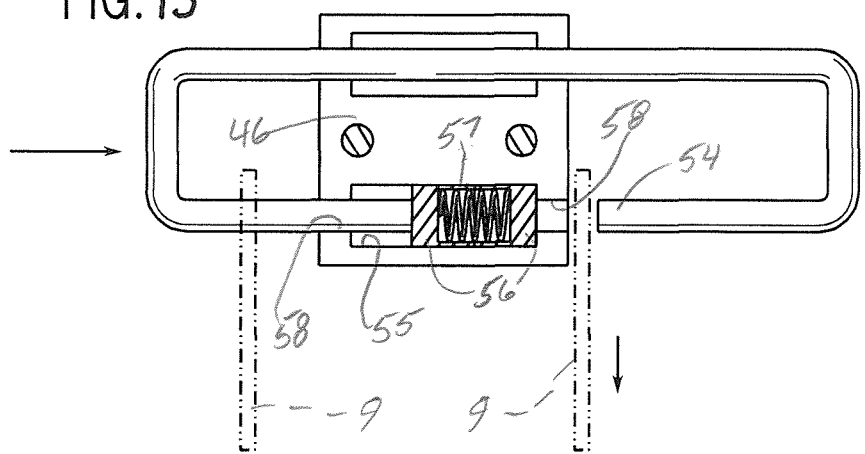

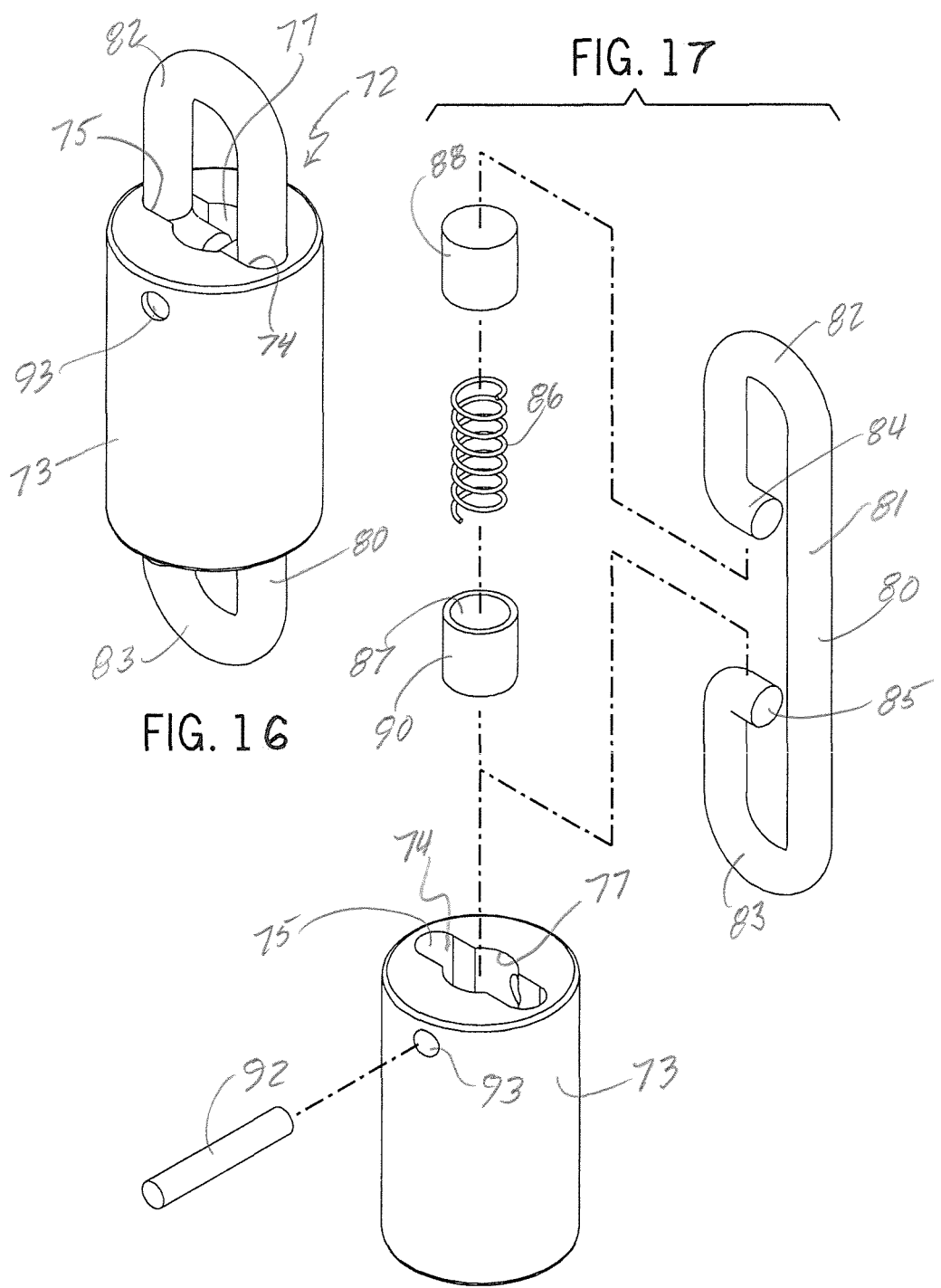

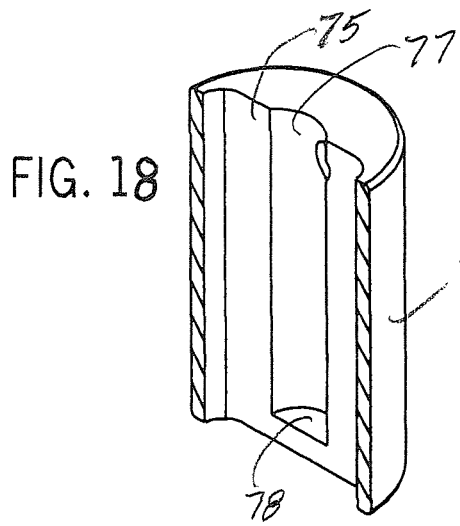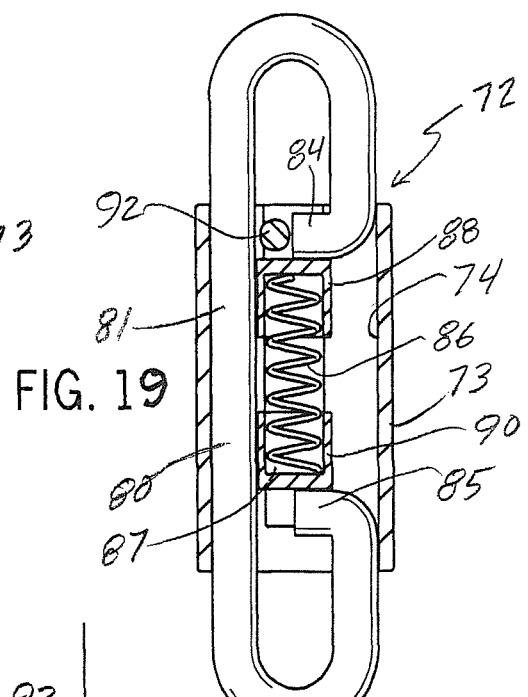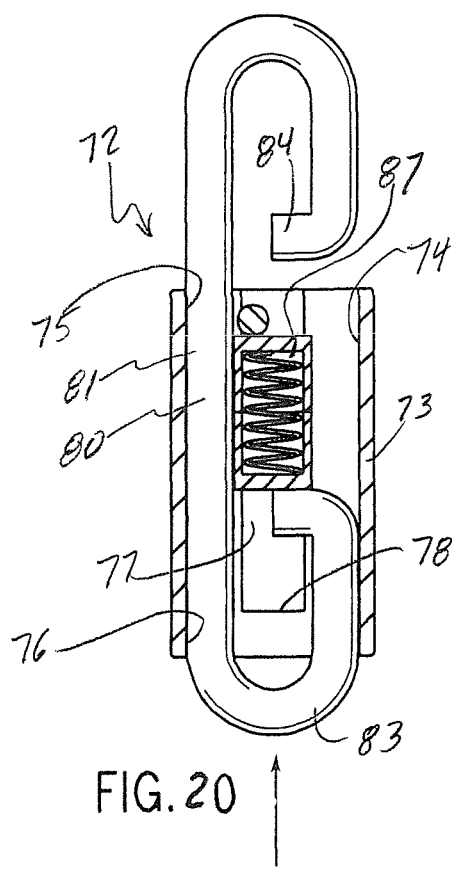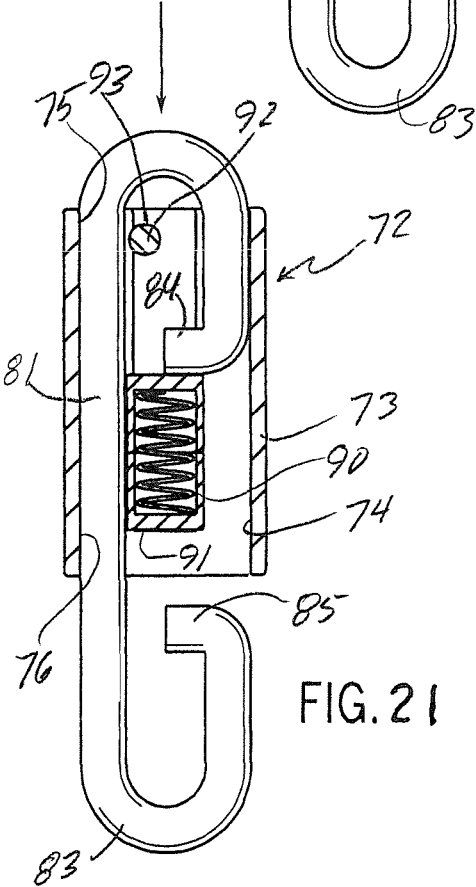
FIG. 18
FIG. 19
FIG. 20
FIG. 21

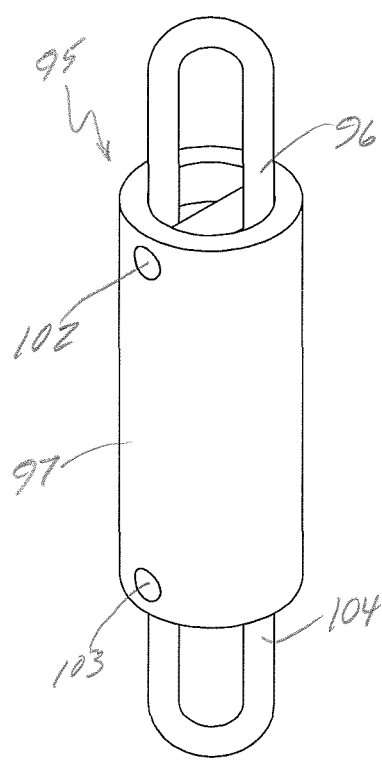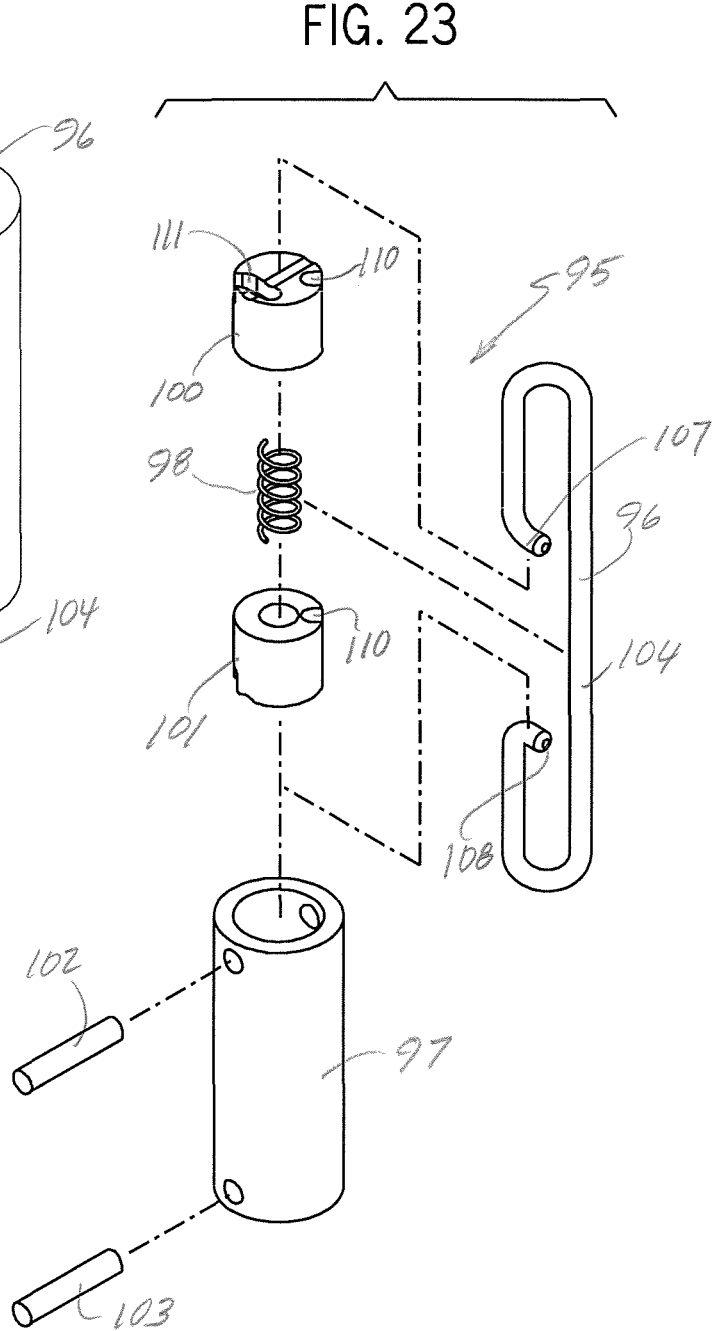

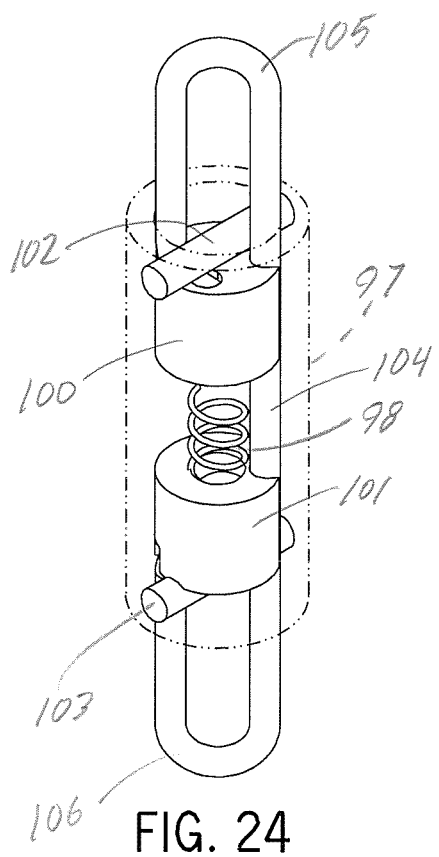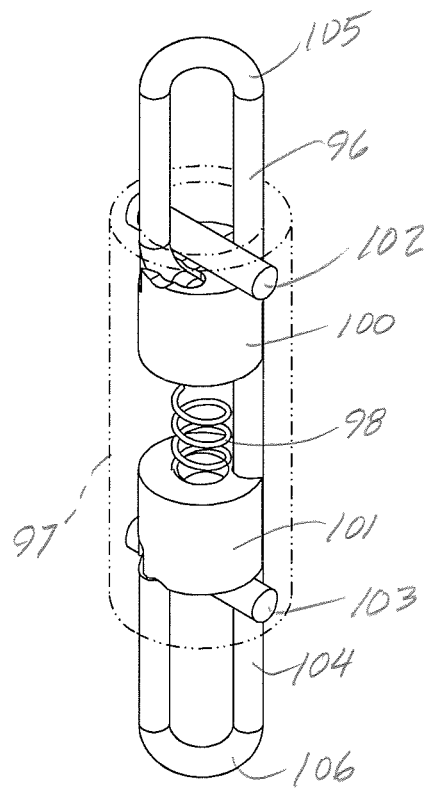
FIG. 24    FIG. 26
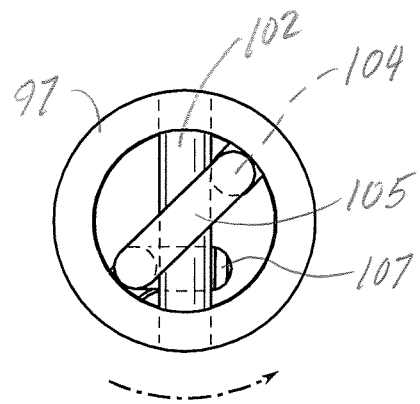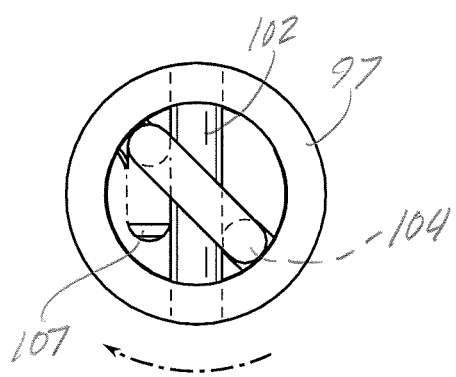
FIG. 25    FIG. 27

US 8,407,862 B2

RELEASABLE BI-DIRECTIONAL CONNECTOR

BACKGROUND OF THE INVENTION

This invention pertains to spring-biased connectors and, more particularly, to a bi-directional connector in which looped ends may be selectively accessed for the attachment of closed loop items, such as keys, or, in its static position, provides a high load tensile connection between items connected to opposite ends, such as lines, ropes and cables.

Spring-biased connectors have found use in many applications including locks, clasps, releasable keepers, fishing tackle and jewelry fixings. Despite the large volume of spring-biased connectors in the prior art, applicant has devised a bi-directional releasable connector that improves on the prior art and has broad application in many areas where conventional prior art fasteners are used today.

SUMMARY OF THE INVENTION

A releasable bi-directional connector includes a housing that has axially aligned opposite open ends. A connector link that has a main tension leg extends through the housing and is movable along an axis generally parallel to the axis of the housing ends, and includes a return loop that extends from each end of the tension leg, each of the loops having opposed spaced free ends. A pair of axially spaced plungers are slidably mounted in opposite ends of the housing and are secured in the housing for limited axial movement parallel to the tension leg between respective stops in the housing. A bias spring is mounted in the housing between the plungers and biases the plungers against the end stops, thereby capturing the free ends of the loops in a static position. Each of the looped ends is selectively axially movable against the bias of the spring to release the selected loop end from capture and to free the end for connection.

BRIEF DESCRIPTION OF THE DRAWINGS

FIGS. 5-8 are side elevation views, partly in section, showing two versions of another embodiment of the invention with alternate arrangements for providing the end stops;

FIGS. 11-13 show the static and open states of the connector of FIGS. 9 and 10;

FIGS. 16 and 17 show assembled and exploded perspective views of another embodiment of the present invention;

FIG. 18 is a vertical section through the housing of the FIG. 16 connector;

FIGS. 19-21 are sectional side elevation views of the FIG. 6 connector showing its static and axially opposite opening movements;

FIGS. 22 and 23 show perspective assembled and exploded views of a locking connector of the present invention;

FIGS. 24-28 show various views of the FIG. 22 connector showing locking and unlocking movement of the connector link.

DETAILED DESCRIPTION OF THE INVENTION

Figure 1:
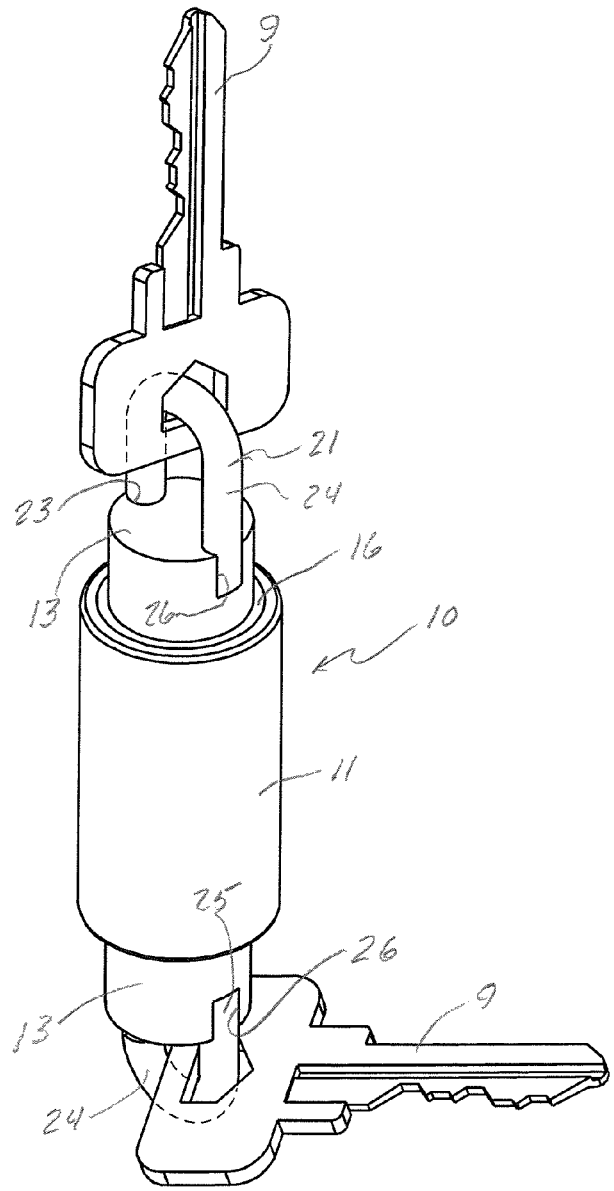
FIG. 1 is a perspective side elevation of one embodiment of the connector of the present invention.
Figure 2:
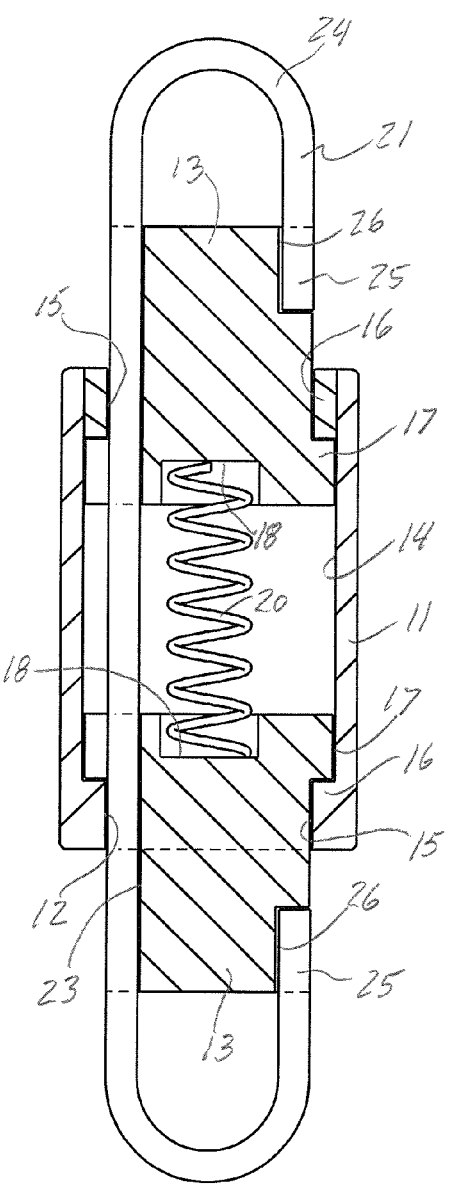
FIG. 2 is a vertical section through the connector of FIG. 1.

Referring initially to FIGS. 1-4, there is shown a releasable connector 10 in accordance with one embodiment of the present invention. The connector has a tubular housing 11 that has aligned opposite open ends 12. The housing 11 receives and partially encloses a pair of axially opposite plungers 13 that are movable axially in the housing bore 14. However, the axial movement of the plungers 13 in the housing bore 14 is limited by a pair of end stops 15. Each end stop comprises a radially inwardly projecting lip in the open end 12 of the housing, and a radially outwardly projecting shoulder 17 on the axially inner end of the plunger 13. In this embodiment, each of the plungers 13 has a circular recess 18 on an inner face in which is seated a coil spring 20 that biases the plungers against the end stops 15, thereby limiting the axial movement of the plungers in an axially outward direction.

The plungers also carry a connector link 21, preferably made of steel or another high tensile strength material. The connector link includes a tension leg 22 that is received in full length axial grooves 23 in the outside surface of the plungers 13. Each end of the tension leg includes a return loop 24 comprising a 180° bend that ends in a straight free end 25. The sides of the plungers diametrically opposite the grooves 23 are provided with short axial slots 26 that receive the free ends 25 of the connecting link 21. The subassembly of the plungers 13, connecting link 21 and coil spring 20 all carried in the cylindrical tubular housing 11.

In a static condition, the coil spring 20 biases the plungers in opposite directions against their respective end stops 15 and the free ends 25 of the connecting link are bottomed in their respective slots 26. In this condition, axially opposite forces applied to the return loops 24 are effectively resisted by the continuous tension leg 22 and there is no movement of any components of the connector 10. However, if it is desired to connect any suitable open loop item to one or both loops 24, one or both loops 24 is movable manually against the bias of the spring 20 to release the selected free end 25 from its slot to move axially beyond the outer end of the plunger 13, thereby opening the loop 24 for attachment of the selected item.

Figures 3, 4:
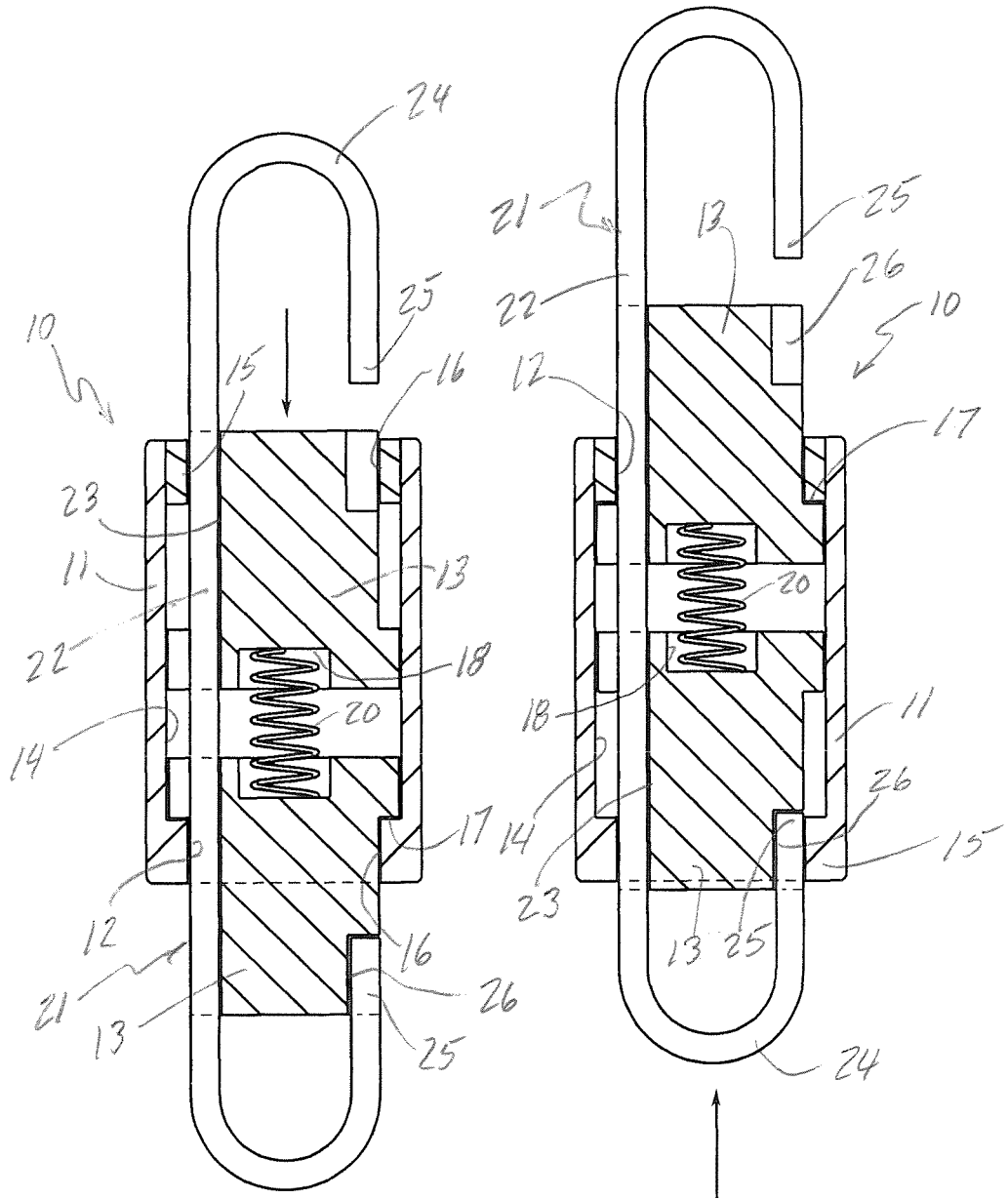
FIGS. 3 and 4 are similar vertical sectional views of the connector of the present invention showing alternate ways in which the connecting loops may be moved from their static position to present open free ends.
Figure 9:
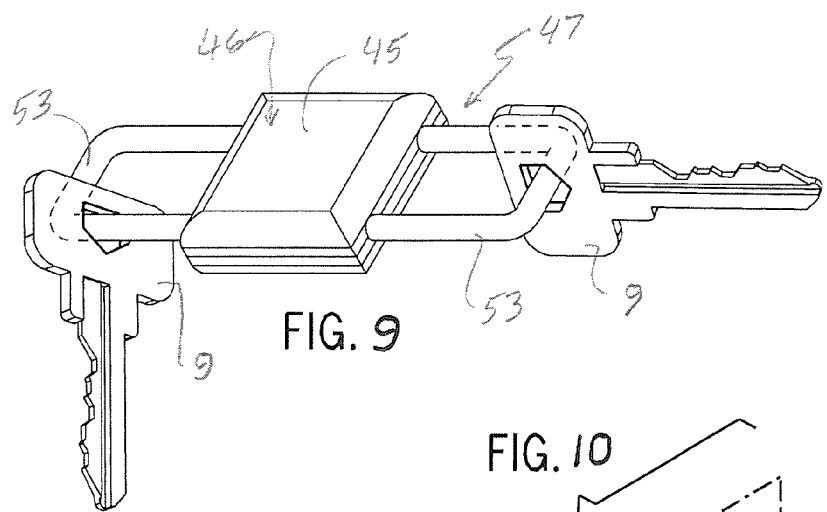
FIGS. 9-10 show an assembled view and an exploded view of yet another embodiment of the invention.
Figure 10:
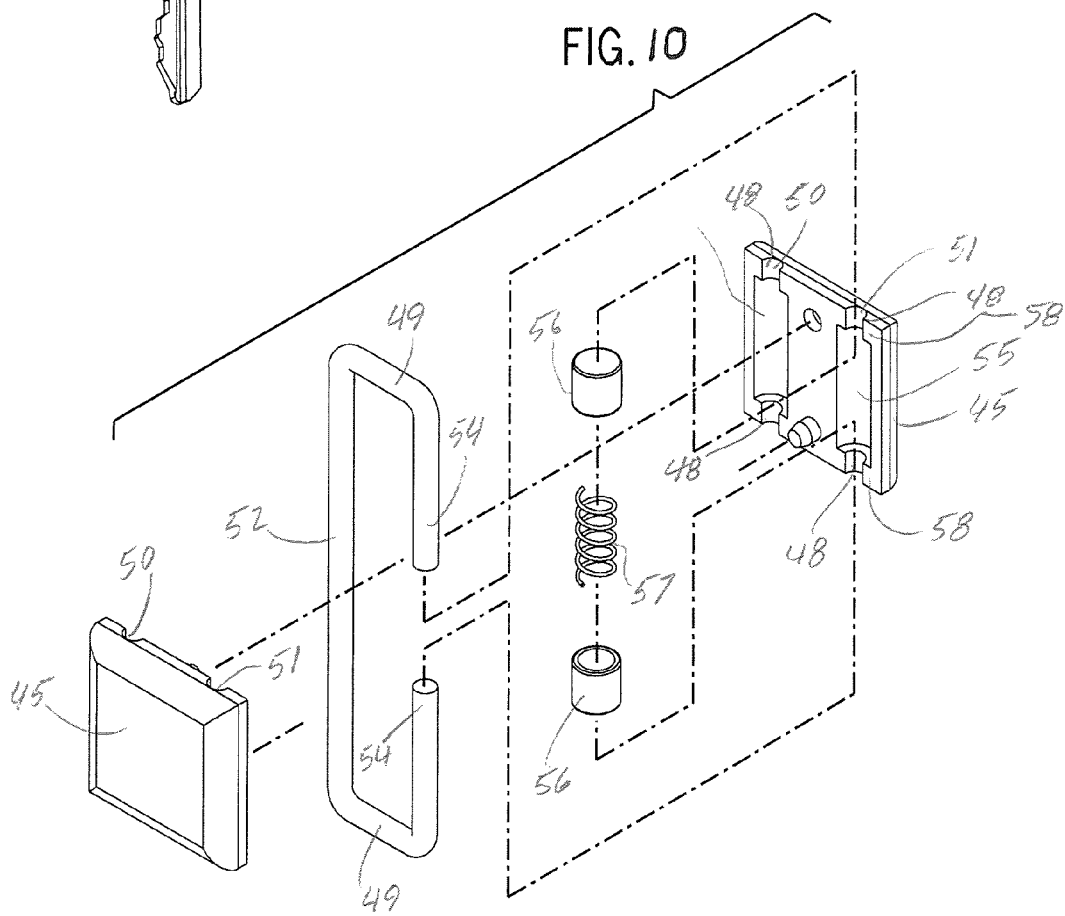

As shown in comparative FIGS. 3 and 4, a return loop and integral free end 25 may be moved axially from its static closed position shown in FIG. 1 in either of two ways. In FIG. 4B, if one of the loops 24 is pushed axially to move its associated plunger 13 into the housing, axial movement of the tension leg 22 will cause the free end 25 of the loop 24 on the opposite end of the connector to move out of its slot 26, thereby exposing the free end for connection. Alternately, as shown in FIG. 4A the same return loop 24 and its free end 25 may be released from the slot 26 by pressing its plunger 13 axially into the housing 11, thereby also exposing the free end 25 for attachment. As mentioned above, when equal and opposite loads are applied to the return loops 24 of the connector link 21, there is no movement of any connector parts and the connector 10 remains in its static position.

Another embodiment of the connector of the present invention is shown in FIGS. 5-8. In this embodiment, the connector 27 includes the same basic components as the connector 10 described above. Thus, the connector 27 includes a housing 28 of hollow tubular construction including a cylindrical inside wall 30 and circular open opposite outer ends 31. It should be noted that the outer wall of the housing 28 may be of any shape besides the cylindrical construction shown in the drawings.

A pair of cylindrical plungers 32 are slidably received in the housing to move axially along the cylindrical inside wall 30 of the housing. The plungers 32 are separated by a coil spring 33 and biased in opposite directions into engagement with end stops 34 in the open ends 31 of the housing. In the FIGS. 5 and 6 embodiment, the end stops 34 comprise circular lips 35 extending radially inwardly from the housing open ends 31. The plungers 32 are biased by the coil spring 33 into engagement with the lips 35, thereby retaining the plungers 32 wholly within the housing 28. The end stop lips 35 may be formed by washers pressed into the open ends 31. Alternately, one of the lips 35 may be formed integrally with the housing and a spring clip 29 snapped into a groove on the opposite open end 31 to provide the other lip. And yet another variation of this embodiment, as shown in FIGS. 7 and 8, the opposite axial ends of the housing 28 may be turned inwardly to form a frustoconical shape 36 that tapers inwardly and provides a barrier to further axial movement of the plunger 32 beyond the open ends 31 of the housing. Preferably, the peripheral edge 37 of each plunger is chamfered to a shape corresponding to the frustoconical surface 36 at the outer ends of the housing.

The connector 27 includes a connector link 38 of essentially the same shape as the connector link 21 of the previously described embodiment. Thus, the connector link includes a tension leg 40 provided at each end with a return loop 41 offset from the tension leg 40, that terminates in a short, straight free end 25. The tension leg 40 is carried in axially aligned openings 43 in the plungers 32. The free ends 42 of the link 38 pass a short distance through axially aligned openings 44 in the plungers 32 diametrically opposite the openings 43. The connecting link offsets 39 defining the free ends 42 of the connector link 38 engage the plungers 32 and prevent further relative movement between the links and one plunger in the axially inward direction. An inward axial force applied to either of the return loops 41 will result in axially inward movement of the associated plunger 32, by the force of the offsets 39 engaging the outside face of the plunger, or as shown in the FIG. 8 version, the bottoming of the free end 42 in the blind recess 59 in the plunger. The opposite free end 42 will be unseated from its static position in the openings 44 and move axially outwardly until it is released from engagement with its associated plunger 32 permitting items to be attached to the loop 41 as shown in FIGS. 6 and 8.

Another embodiment of the invention is shown in FIGS. 9-13. In this embodiment, there is shown one half 45 of a connector housing 46, the other half being a mirror image thereof and removed to expose the internal construction of the connector 47. The housing 46 has pairs 50 and 51 of axially aligned bores 48. Tension leg 52 of a connector link 53 is slidably received in one pair 50 of the bores 48. The opposite free ends 54 of the connector link 53 are received in the other pair 51 of bores 48. The housing body includes an interior cylindrical recess 55 that is coaxial with the other pair 51 of bores. The cylindrical recess 55 contains a pair of oppositely disposed plungers 56 biased apart by a coil spring 57. The bores 51 are defined by shoulders 58 that are contacted by the spring-biased plungers 56 to provide end stops limiting axially outward movement of the plungers. The free ends 54 of the connector link engage their respective plungers 56 in the static position shown in FIG. 11, but are not attached to the plungers.

The operation of this connector 41 is the same as the operation of the connectors 10 and 27 previously described. An inwardly directed axial force applied to one of the return loops 49, as shown in FIG. 12, will cause the connector link 53 to move axially with the free end 54 of the link forcing its associated plunger 56 to move against the bias of the coil spring 57. Simultaneously, free end 54 of the other end of the connector link 53 will move axially away and out of the bore 51 in which it is seated. Sufficient axial movement is provided to enable the free end 54 to move away from the housing 46 providing a gap for the attachment of a closed loop item, such as a key 9, to the return loop 49. FIG. 13 shows how a key 9 may be similarly attached to and removed from the connector 47.

Figure 14:
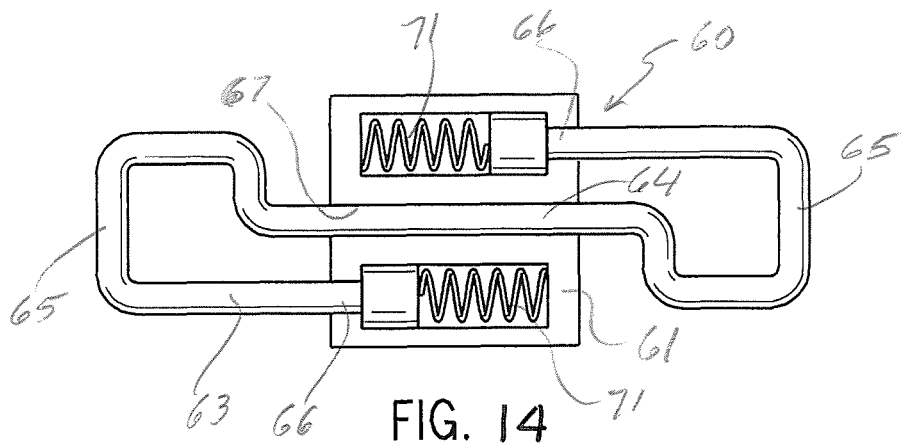
FIGS. 14 and 15 show an alternate embodiment, of another variation of the FIGS. 11-13 connector.
Figure 15:
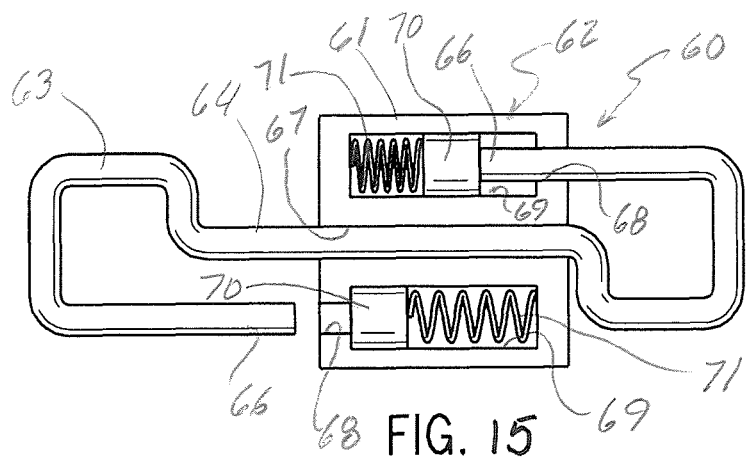
Figure 28:
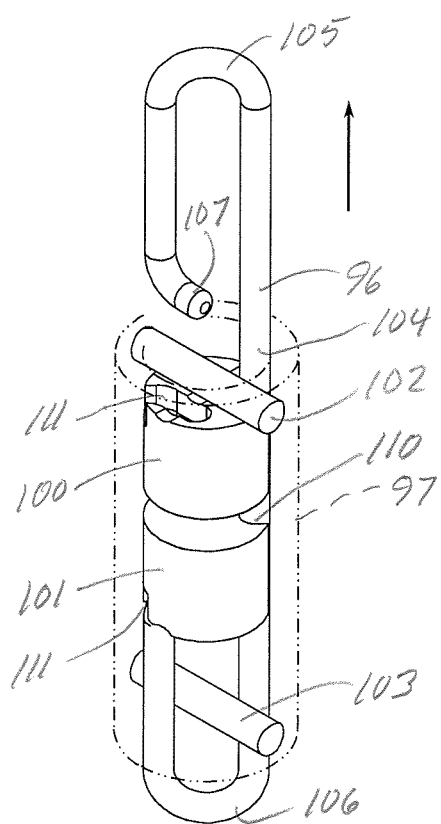

In FIGS. 14-15, there is shown a modified construction of a connector 60 that is similar to the connector 47 previously described. Only one half 61 of the two piece housing 62 is shown in order to best describe the internal construction and function of the connector. A connector link 63 includes a center tension leg 64 and return loops 65 on opposite ends of the tension leg. In this embodiment, the return loops 65 are bent in opposite directions such that the loops have free ends 66 positioned on opposite sides of the tension leg 64 and separated 180° rotationally. The tension leg 64 is slidably disposed in an axial throughbore 67 in the center of the housing 62. On opposite ends of the housing, there is a single small bore 68 for receipt of a free end 66 of the connector link 63. Each small bore 68 opens into a larger diameter cylindrical recess 69 on each lateral side of the housing 62. Each small bore 68 receives a free end 66 of the connector link which engages (but is not attached to) a plunger 70 slidably mounted in the recess 69 and biased into engagement with the free end by a coil spring 71. Each of the coil springs 71 bottoms in the end of the cylindrical recess opposite the small bore 68.

Operation of connector 60 is similar to the connectors of all of the previously described embodiments and variations. Pressing one of the return loops 65 axially inwardly against the bias of its coil spring will cause the rigid tension leg 64 to move the opposite return loop 65 axially outwardly in the same direction, resulting in the free end 66 of that loop being drawn out of its small bore 68 until the end is spaced sufficiently from the housing 62 to allow attachment of a closed loop object thereto. This embodiment is not preferred because of the duplication of coil springs 71.

A further embodiment of the releasable connector of the present invention is shown in drawing FIGS. 16-21. The connector 72 of this embodiment includes an outer housing 73 provided with an axially extending oblong slot 74 extending through the housing and defining oblong upper and lower openings 75 and 76, respectively. The oblong slot 74 is interrupted by a coaxial cylindrical bore 77 that extends from the upper opening 75 to a stop shoulder 78 near the bottom end of the cylindrical bore 77. A connector link 80 is movable freely into and through the slot 74. The link 80 includes a tension leg 81 having upper and lower return loops 82 and 83, respectively, each having an L-shaped free end 84, 85.

A coil spring 86 is captured by its opposite ends in cylindrical blind recesses 87 in an upper plunger 88 and a lower plunger 90. The connector link 80 is inserted axially into the oblong slot 74 in the housing with the subassembly of the coil spring 86 and plungers 88 and 90 positioned between the upper and lower L-shaped free ends 84 and 85 of the connector link return loops 82 and 83. The lower return loop 83 of the connector link passes axially through the oblong slot 74 to extend beyond the lower opening 76. However, the closed end 91 of the lower plunger 90 engages the stop shoulder 78 in the cylindrical bore 77 to provide a lower stop for the bias spring subassembly. The upper plunger 88 is pressed axially downwardly against the bias of the spring 88 and a locking pin 92 is inserted through aligned cross bores 93 in the upper edge of the outer housing 73. The locking pin 92 provides an upward stop against axial movement of the upper plunger 88 and holds the entire connector assembly 72 together.

As with the previously described embodiments, an axial force imposed on either of the return loops 82 or 83 moves the other return loop axially against the bias of the spring 86 until its free end 84 or 85 passes outwardly beyond the upper or lower opening 75 or 76 to expose the free end for connection to the respective loop 82 or 83.

A further embodiment of the releasable connector of the present invention is shown in FIGS. 22-28. In this embodiment, both ends of the connector may be locked in the neutral closed position to prevent inadvertent axial movement of either end to the open position. Movement of the connector link 96 between the locked and unlocked positions requires only a ¼-turn of the connector link 96.

The construction and assembly of the connector 95 is similar to the connector 72 of the previously described embodiment. The connector 95 includes an outer housing 97 within which are captured the connector link 96 and a biasing subassembly comprising a coil spring 98 and upper and lower plungers 100 and 101, respectively, retained within the housing 97 by upper and lower cross pins 102 and 103, respectively.

The connector link 96 includes a tension leg 104, upper and lower return loops 105 and 106, and upper and lower L-shaped free ends 107 and 108, respectively. The L-shaped free ends 107 and 108 are bent slightly out of the plane of the connector link 96 so as to be positioned with respect to the plane at and angle of approximately 45°. In the assembled arrangement, the connector link 96 is centered axially in the outer housing 97 with the tension leg 104 slidably received in aligned axial grooves 110 in the outer surfaces of the plungers 100 and 101. The L-shaped free ends 107 and 108 of the connector link 96 are seated in complimentary end slots 111 in the upper surfaces of the plungers 100 and 101. The coil spring 98 biases the plungers in opposite axial directions, but the upper and lower cross pins 102 and 103 provide stops to limit axial outward movement of the plungers 100 and 101 beyond their static position when the connector 95 is closed. The cross pins 102 and 103 also provide stops to help limit rotation of the connector link-plunger subassembly between the locked and unlocked positions.

In the locked position, as best seen in FIGS. 25 and 26, the L-shaped free ends 107 and 108, which are seated in their respective end slots 111, extend beneath the cross pin 102 or 103 and prevent axial movement of the connector link 80 in either axial direction. In this position, cross pins seat in the end slots 111, held therein by the bias of the spring 98.

To unlock the connector link 96, it is turned axially approximately 45° (clockwise with respect to the housing 97 in FIG. 27), carrying with it the engaged plunger 100 or 101 until the L-shaped legs 107 and 108 are retracted from beneath the cross pins 102, 103, and the turning movement causes the cross pins to deflect the plungers slightly and ride out of the transverse grooves 112 in the plungers in which the cross pins are seated in the locked position. The cross pins prevent further rotational movement and, with the L-shaped free ends of the connector link out of engagement with the undersides of the cross pins, the return loop 105 or 106 at either end of the connector link 96 can be pushed or pulled axially until the free end is clear of the housing 97 for receipt of a closed loop item to be connected with or to the connector.

I claim:

1. A releasable connector comprising:
   a housing having axially aligned opposite open ends;
   a connector link having a main tension leg extending through the housing and movable along an axis generally parallel to the axis of the housing ends, a return loop extending from each end of the tension leg, said loops having opposite spaced free ends;
   a pair of axially spaced plungers slidably mounted in opposite ends of the housing and secured therein for limited axial movement parallel to the tension leg between respective end stops in the housing; and,
   a bias spring mounted in the housing between the plungers and biasing the plungers against the end stops and engaging the free ends of the loops in a static position, each of the free ends of the loops being selectively axially movable against the bias of the spring to release a selected free end of the loops from engagement and to free said end for connection.

2. The apparatus as set forth in claim 1 wherein the free end of the loops is axially movable relative to the associated plunger.

3. The apparatus as set forth in claim 1 wherein:
   the open ends of the housing are circular; and
   the plungers have cylindrical bodies and outer ends movable between an extended position outside the housing in the static position and a retracted position substantially coincident with the housing open end in the loop release position.

4. The apparatus as set forth in claim 3 wherein each of the end stops comprises:
   a radially inwardly projecting lip in the open end of the housing; and
   a radially outwardly projecting shoulder on the axially inner end of the plunger.

5. The apparatus as set forth in claim 4 wherein one lip is formed integrally with the housing, and the other lip comprises a snap ring.

6. The apparatus as set forth in claim 5, wherein both lips are formed integrally with the housing.

7. The apparatus as set forth in claim 6 wherein one lip is formed prior to insertion of the plungers and spring into the housing and the other lip is formed after said insertion.

8. The apparatus as set forth in claim 7 wherein said other lip is swaged.

9. The apparatus as set forth in claim 3 wherein each plunger has a full axial length groove for receipt of the tension leg, and an axial slot adapted to receive the free end of a return loop.

10. The apparatus as set forth in claim 9 wherein the free ends of the return loops engage in the slots in the static position.

11. The apparatus as set forth in claim 10 wherein the slots are coaxial.

12. The apparatus as set forth in claim 3 wherein the bias spring comprises a coil spring.

13. The apparatus as set forth in claim 12 wherein the inner axial ends of the plungers include recesses for receipt of the opposite ends of the coil springs.

14. The apparatus as set forth in claim 1 wherein:
   the open ends of the housing are circular; and
   the plungers have cylindrical bodies and outer ends, each plunger end movable between an extended position substantially coincident with the housing opening in the static position and a retracted position within the housing in the loop release position.

15. The apparatus as set forth in claim 14 wherein each stop comprises an inturned radial lip defining the open end of the housing and engaged by the peripheral edge of the plunger under the bias of the spring.

16. The apparatus as set forth in claim 15 wherein the radial lip is frustoconical and the peripheral edge is chamfered.

17. The apparatus as set forth in claim 1 wherein:
the open ends of the housing comprise pairs of axially aligned bores;
one of said pairs of bores carrying the tension leg, and the other of said pairs carrying the free ends of the return loops.

18. The apparatus as set forth in claim 17 including a plunger chamber in the housing coaxial with the other of said pairs of bores, the chamber carrying the plungers and the bias spring, said chamber having a larger diameter than said bores and defining shoulders on opposite ends of the chamber, said shoulders comprising the end stops.

19. A two-ended releasable connector for connecting, holding and selectively releasing closed loop items, comprising:
a connector link having a straight tension leg, a U-shaped looped return on each end of the tension leg, the looped returns having opposed spaced free ends;
a housing for the connector link having opposite ends carrying a pair of plungers each held in the housing for limited axial movement with respect to the connector link and the housing, the plungers engaging the tension leg and the free ends of the connector link in a static closed position; and
a bias spring in the housing extending between the plungers and holding the connector link in the closed position, the spring being compressible in response to a selective axial movement of the connector link and one of the plungers to expose one of the free ends for connection.

20. The connector as set forth in claim 19 wherein the housing has an oblong through slot for slidable receipt of the connector link, the free ends of the link turned inwardly toward the tension leg;
a cylindrical coaxial bore extending through the oblong slot for receipt of the plungers and the bias spring; and
end stops on opposite ends of the coaxial bore to hold the plungers against axial movement out of respective opposite ends of the housing.

21. The connector as set forth in claim 20 wherein one end stop comprises a stop shoulder in the end of the cylindrical coaxial bore, and the other end stop comprises a locking pin extending through aligned cross bores in the housing.

22. A releasable connector comprising:
a housing having open opposite ends;
a pair of plungers slidably mounted for limited axial movement between end stops at the opposite ends of the housing;
a connector link having a tension leg extending through the housing and having looped return ends extending outside the housing, the return ends having axially spaced free ends extending into engagement with the plungers in a static closed position; and
a bias spring in the housing between the plungers and biasing the plungers into contact with the end stops in the static closed position, the connector link being selectively axially movable with respect to one of the plungers against the bias of the spring to release a selected one of the free ends from engagement with its associated plunger and to move the free end axially beyond the one end of the housing.

23. The connector as set forth in claim 22 wherein the connector link and the plungers are rotatable together within the housing; and
the end stops comprise a pair of axially spaced parallel cross pins engageable by the connector link to provide limited rotational movement between a locked position and an unlocked position.

24. The connector as set forth in claim 23 wherein the free ends of the looped return ends of the connector link have a leg bent out of the plane of the link, said leg underlying and in engagement with a cross pin in the locked position and free of engagement with the cross pin in the unlocked position.

* * * * *

UNITED STATES PATENT AND TRADEMARK OFFICE
CERTIFICATE OF CORRECTION

PATENT NO. : 8,407,862 B2  
APPLICATION NO. : 12/848418  
DATED : April 2, 2013  
INVENTOR(S) : Conrad Bluma Page 1 of 1

It is certified that error appears in the above-identified patent and that said Letters Patent is hereby corrected as shown below:

IN THE CLAIMS

CLAIM 2, column 6, line 20, before "free" insert -- selected --.

Signed and Sealed this  
Eighteenth Day of June, 2013

Teresa Stanek Rea  
*Acting Director of the United States Patent and Trademark Office*